(12) United States Patent
Beldam

(10) Patent No.: US 6,742,256 B2
(45) Date of Patent: Jun. 1, 2004

(54) METHOD AND APPARATUS FOR FLEXIBLE CONSTRUCTION OF HEAT EXCHANGER TANKS

(75) Inventor: Richard Paul Beldam, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/866,185

(22) Filed: May 25, 2001

(65) Prior Publication Data

US 2001/0045013 A1 Nov. 29, 2001

Related U.S. Application Data

(63) Continuation-in-part of application No. 09/207,886, filed on Dec. 8, 1998, now abandoned.

(51) Int. Cl.⁷ .................................................. B23P 15/26
(52) U.S. Cl. ............................ 29/890.052; 29/890.031
(58) Field of Search ....................... 29/890.052, 890.03, 29/890.031, 401.1; 165/173, 175, 76

(56) References Cited

U.S. PATENT DOCUMENTS

| | | | | |
|---|---|---|---|---|
| 1,593,245 A | * | 7/1926 | Culter | 180/68.4 |
| 3,497,936 A | * | 3/1970 | Donaldson | 29/890.043 |
| 4,179,884 A | * | 12/1979 | Koeslin | 60/321 |
| 4,308,652 A | * | 1/1982 | Woodhull, Jr. | 29/890.052 |
| 5,097,891 A | * | 3/1992 | Christensen | 165/41 |
| 5,373,896 A | * | 12/1994 | Osborn | 165/173 |
| 5,464,145 A | | 11/1995 | Park et al. | |
| 5,501,271 A | | 3/1996 | Wijkstrom | |
| 5,570,738 A | | 11/1996 | Christensen | |
| 5,582,239 A | | 12/1996 | Tsunoda et al. | |
| 5,894,649 A | | 4/1999 | Lambert et al. | |

\* cited by examiner

*Primary Examiner*—Charles T. Jordan
*Assistant Examiner*—T. Nguyen
(74) *Attorney, Agent, or Firm*—Ephraim Starr

(57) ABSTRACT

Heat exchanger header tanks are constructed from a basic set of components. The basic components are castings and simple formed sheet parts. The components are assembled to produce a heat exchanger tank having a desired size and geometry.

4 Claims, 8 Drawing Sheets

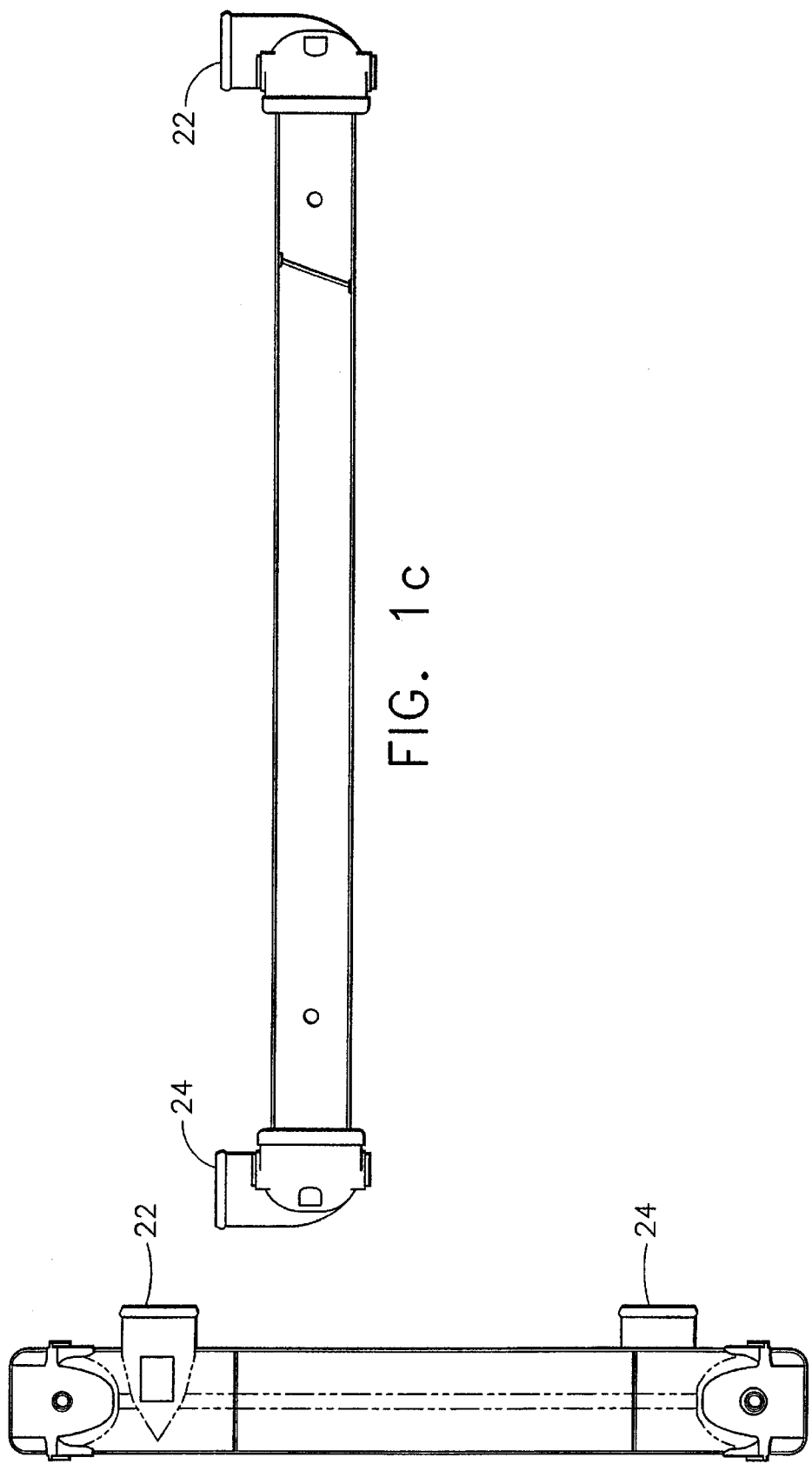

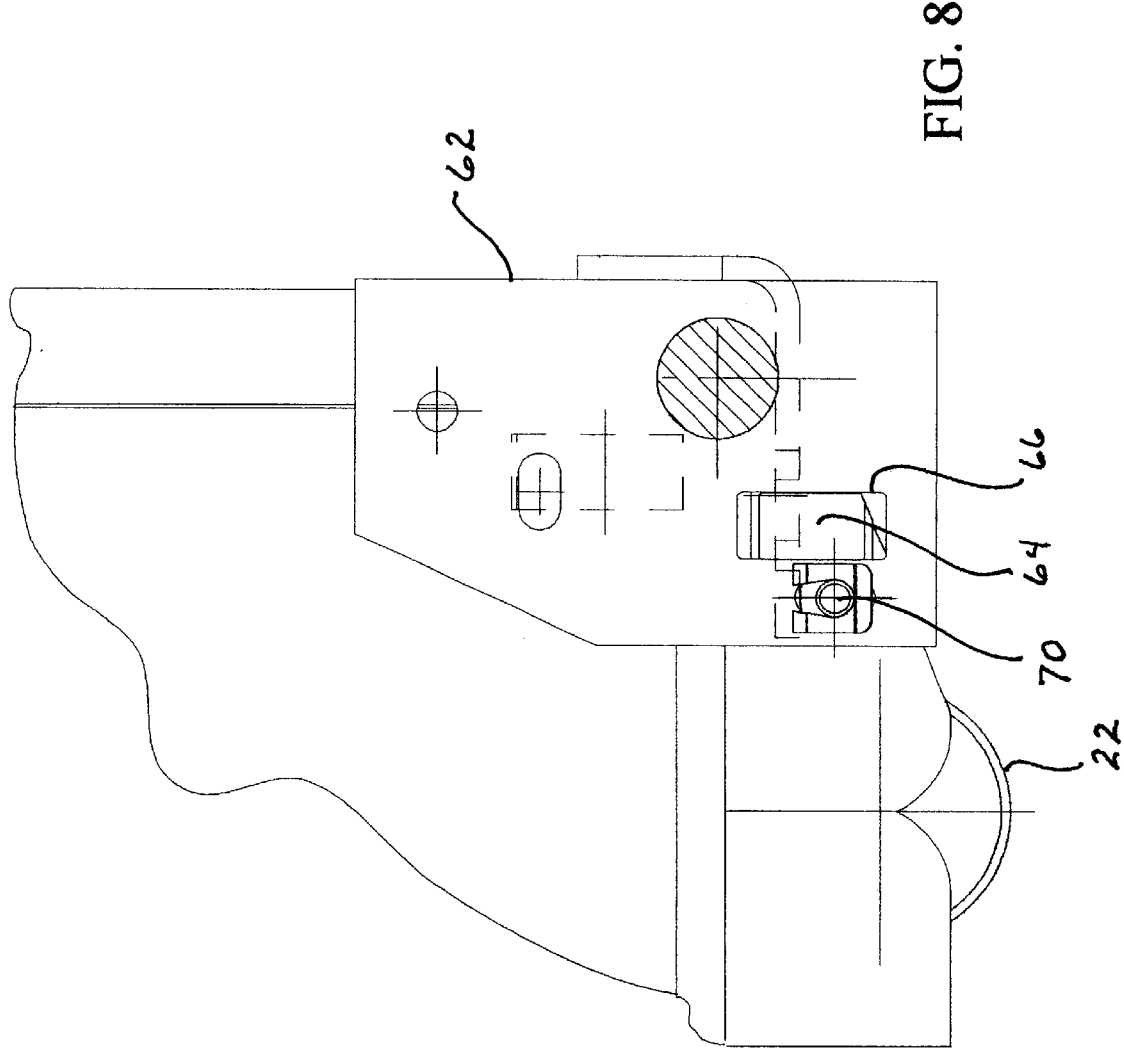

METHOD AND APPARATUS FOR FLEXIBLE CONSTRUCTION OF HEAT EXCHANGER TANKS

REFERENCE TO RELATED APPLICATIONS

This application is a continuation-in-part of application Ser. No. 09/207,886 filed on Dec. 8, 1998 now abandoned entitled METHOD AND APPARATUS FOR FLEXIBLE CONSTRUCTION OF HEAT EXCHANGER TANKS and having a common assignee with the present application.

BACKGROUND OF THE INVENTION

1. Field of the Invention

The present invention relates generally to heat exchangers, and more particularly to a method and apparatus for constructing heat exchanger tanks that allows for flexibility in size and geometry.

2. Description of the Related Art

A variety of heat exchangers may be used in the cooling system of an internal combustion engine of a motor vehicle. The cooling system disclosed in U.S. Pat. No. 5,570,738 to Christensen includes three different heat exchangers disposed in series flow relationship with one another: (1) a condenser for receiving high pressure, superheated refrigerant gas from the refrigerant compressor and condensing the gas into a high pressure liquid for expansion and cooling of the vehicle cab; (2) a charge air cooler (CAC) for cooling the turbocharged engine intake air before the air enters the engine for the combustion process; and (3) a radiator for eliminating waste heat from the internal combustion engine of the vehicle.

Heat exchangers typically include a central core, and generally vertically disposed end manifolds or header tanks attached to opposite lateral ends of the core. The core comprises a plurality of tubes and fins, typically disposed in alternating laterally extending rows, with the tubes communicating with header tanks so as to provide a flowpath through the heat exchanger. Ambient cooling air is forced across the tubes and fins during operation of the vehicle resulting in heat transfer from the gas or fluid flowing through the heat exchanger to the ambient air stream.

Heat exchangers, such as the radiator, CAC and condenser are surface area dependent, in that the temperature reduction achievable in a heat exchanger depends on the available surface area of the design. Therefore, a myriad of different size heat exchangers are necessary to accommodate the different thermal requirements present in different applications. Varying the size of a heat exchanger requires varying the size of the header tanks. However, conventional heat exchanger tank designs require specific tooling for each different design application, as the header tanks are generally cast as a single piece. This is expensive and results in long lead times for both prototype and production parts.

Consequently, a need exists for an improved heat exchanger tank design and for a method of constructing heat exchanger tanks that allows for flexibility in size and geometry.

SUMMARY OF THE INVENTION

The present invention, therefore, provides a method for construction of heat exchanger header tanks that allows for flexibility in size and geometry. The header tanks are constructed from a set of basic components that can be assembled as required to match a desired tank design for any application. The basic components are cast or formed from simple sheet metal parts. The components are assembled to produce a tank of the desired size and geometry. The individual components are then connected together, and the final tank assembly is then affixed to the heat exchanger core.

The basic components of the heat exchanger tanks consist of castings which form the tank ends, inlet/outlet fittings, and combination tank ends with inlet/outlet fittings and structural support attachments, and formed sheet metal center sections which connect the cast portions to form the completed tank.

BRIEF DESCRIPTION OF THE DRAWINGS

These and other features and advantages of the present invention will be appreciated as the same become better understood by reference to the following Detailed Description when considered in connection with the accompanying drawings, wherein:

FIG. 1b is a side elevation view of a heat exchanger according to the present invention, having a pair of flexible header tanks;

FIG. 1c is a top elevation view of a heat exchanger according to the present invention, having a pair of flexible header tanks;

FIGS. 2a, 2b, 2c and 2d are top, front and side elevation views of the flexible header tanks of FIG. 1a;

FIGS. 6a and 6b are top and front elevation views of an alternate embodiment of the header tank of FIG. 2a;

FIG. 8 is a partial detail view of the corner frame of the module and its attachment to the tank end component.

DETAILED DESCRIPTION OF THE INVENTION

Figure 1A:
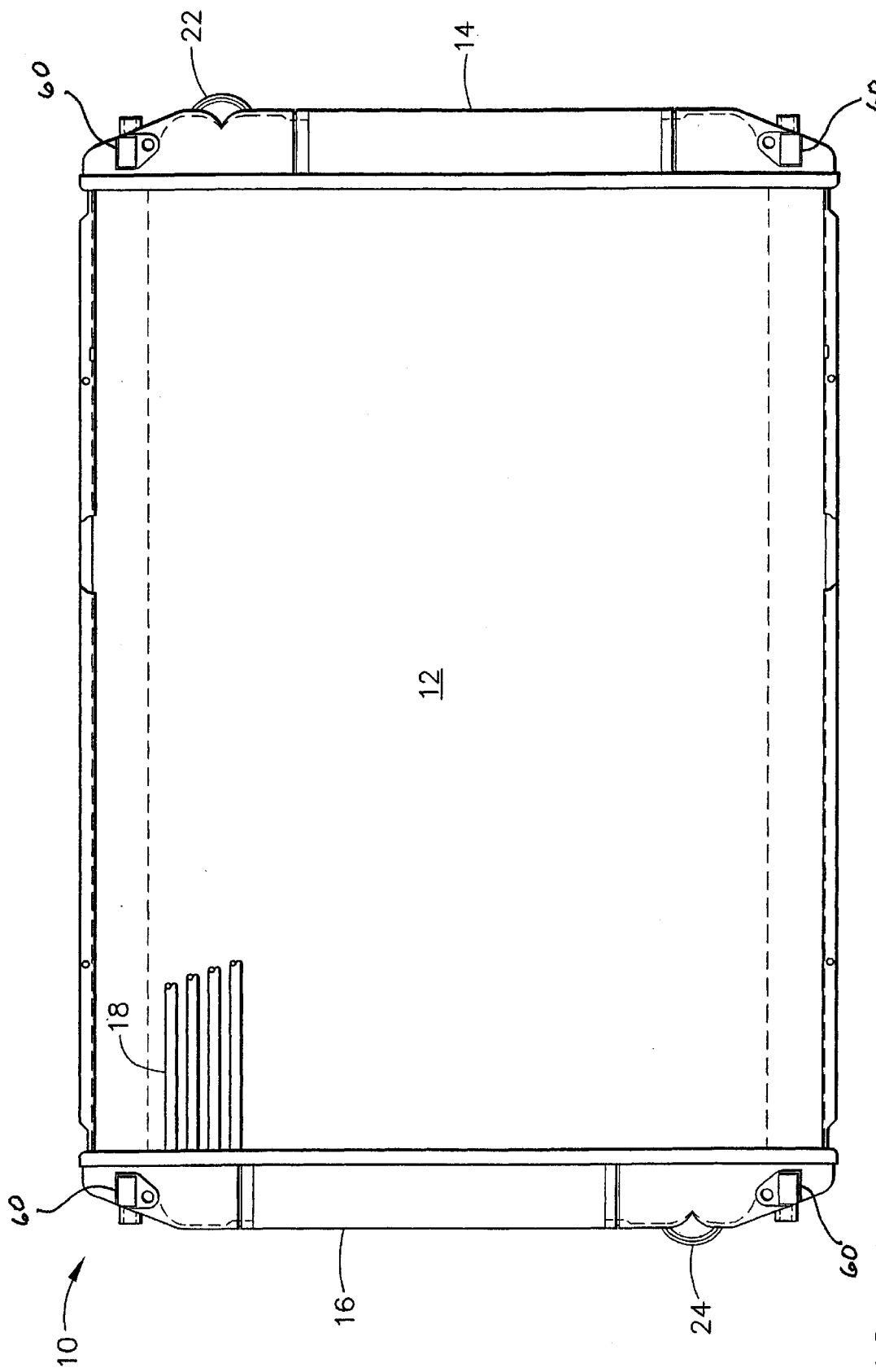
FIG. 1a is a front elevation view of a heat exchanger according to the present invention, having a pair of flexible header tanks.
Figure 2A:
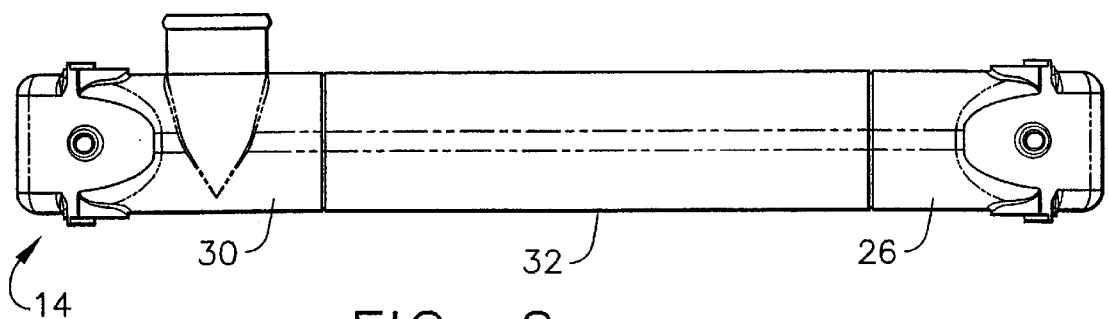
Figure 2B:
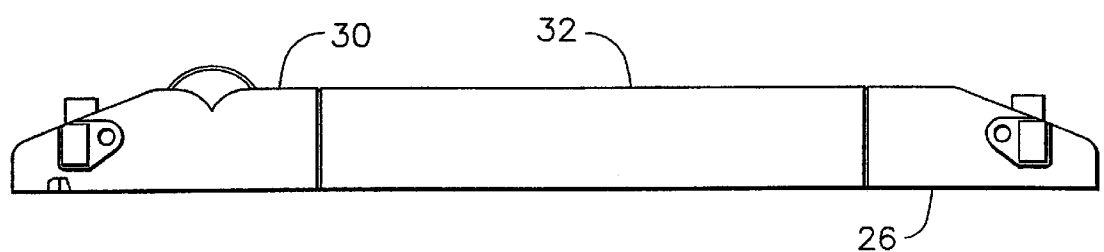
Figure 2C:
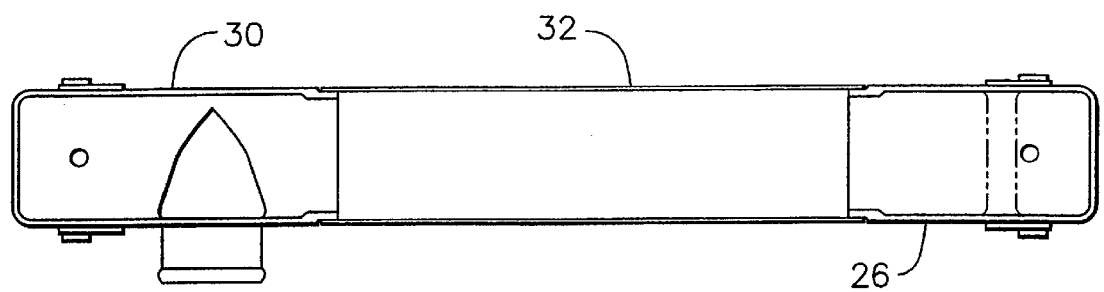
Figure 2D:
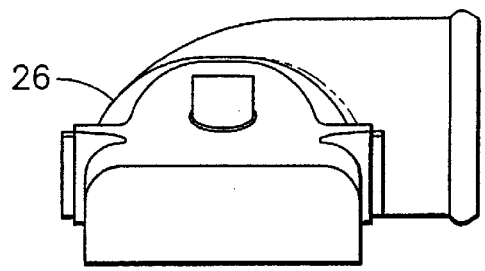

Referring now to the drawings, FIGS. 1a–1c illustrate a heat exchanger, indicated generally at 10, according to the present invention. The heat exchanger 10 includes a central core 12, and first and second header tanks or end manifolds 14, 16, respectively, which are attached to opposite ends of the heat exchanger core 12. The core includes a plurality of laterally extending tubes, which are substantially parallel to one another and which are in fluid flow communication with the header tanks 14, 16 of the heat exchanger. The core 12 also includes a plurality of laterally extending fins having a serpentine, or corrugated shape which are interdigitated with the tubes.

The heat exchanger 10 further includes an inlet fitting 22, which communicates with the inlet header tank 14 of the heat exchanger and is effective for receiving a fluid to be cooled during operation of the heat exchanger. Heat exchanger 10 also includes an outlet fitting 24, which communicates with the outlet header tank 16 of the heat exchanger. During operation of the heat exchanger, fluid flows through the inlet fitting 22 into the inlet header tank 14, through the tubes 18 where it is cooled by ambient air flowing over the heat exchanger, and into the outlet header tank 16, where it is discharged through the outlet fitting 24.

Referring now to FIGS. 2a–6b, additional structural features of the heat exchanger tanks 14, 16 are illustrated in greater detail. The header tanks 14, 16 are comprised of a common set of basic components which can be assembled as required to match the desired tank design for any application. The basic components are castings and simple formed sheet metal parts. The components are assembled to produce a tank of the desired size or shape. The individual components are welded together and the final tank assembly is then welded onto an end of the heat exchanger core.

The basic components of the heat exchanger header tanks consist of castings which form the tank ends 26, inlet/outlet fittings 28, combination tank ends with fittings 30, and formed sheet metal center sections 32 which connect the cast portions to form the completed tank. These basic components are combined to provide the required geometry for each application.

In a presently preferred embodiment, the cast components are cast from aluminum alloy 319, and the sheet components are formed from 5052-H32 aluminum. However, it should be understood that any other suitable materials or processes may be used for the various components including deep draw stamping of sheet metal or comparable processes.

The use of a common set of basic components for construction of heat exchanger tanks provides flexibility of size and geometry of the tank design. The sheet metal center sections 32 provide the necessary flexibility such that the size of the tanks are easily varied as dictated by the thermal requirements of the heat exchanger. Center sections are added, removed, or adjusted between the cast sections as needed to arrive at the desired tank size and geometry. Additionally, using one set of tooled parts reduces design, tooling and construction costs, along with lead time required for both prototype and production parts.

In the heat exchanger illustrated in FIG. 1a, header tanks 14, 16 consist of a tank end 26, a tank end with a fitting 30, and a formed center section 32 extending between the tank end 26 and the tank end with the fitting 30. This configuration of the header tanks, and its components are illustrated in FIGS. 2a–6b.

Figure 3A:
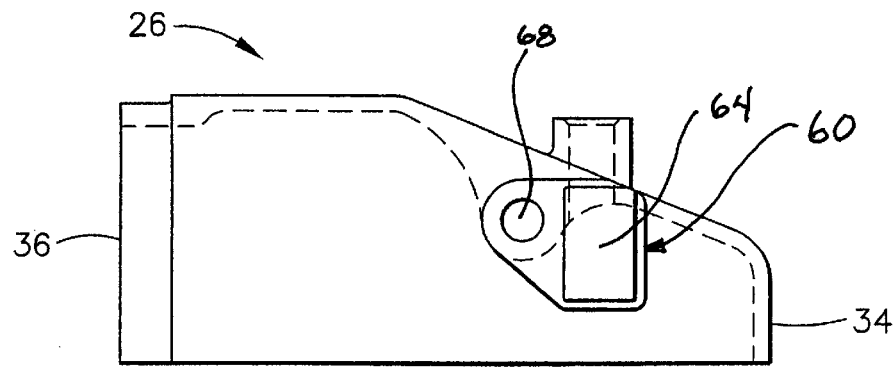
FIGS. 3a, 3b and 3c are multiple sectional views of a tank end component.
Figure 3B:
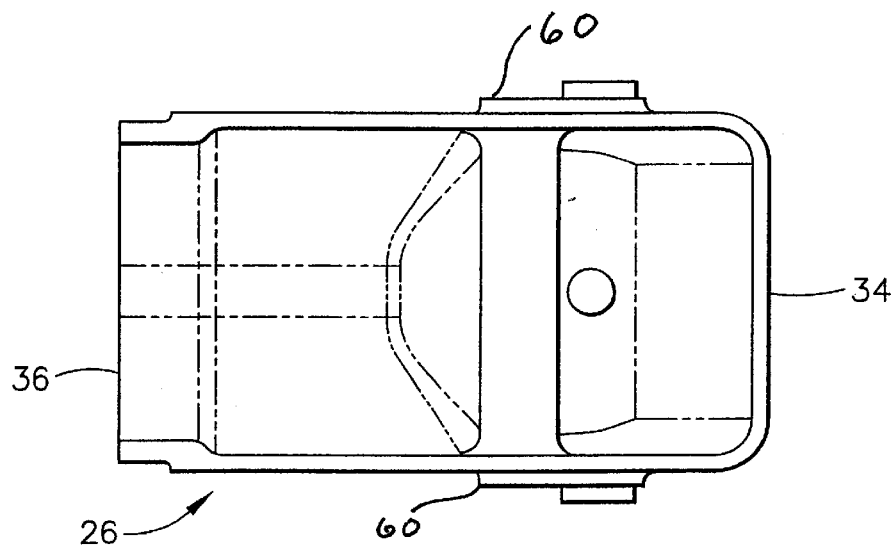
Figure 3C:
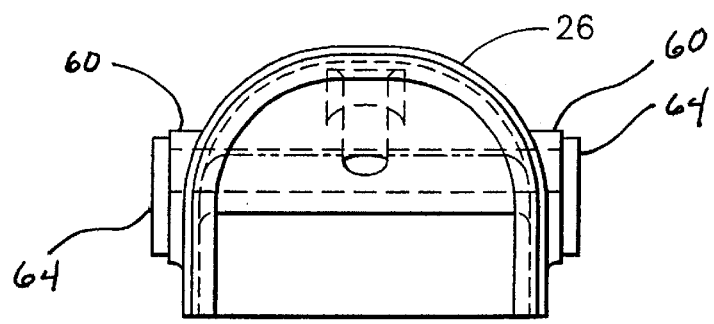
Figure 4A:
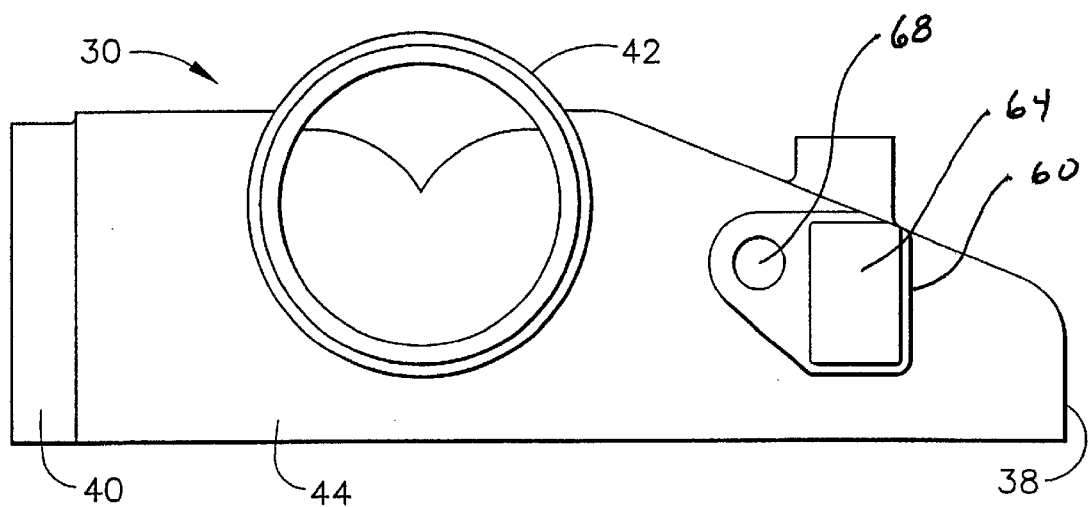
FIGS. 4a, 4b and 4c are multiple sectional views of a combination tank end component with a fitting.
Figure 4B:
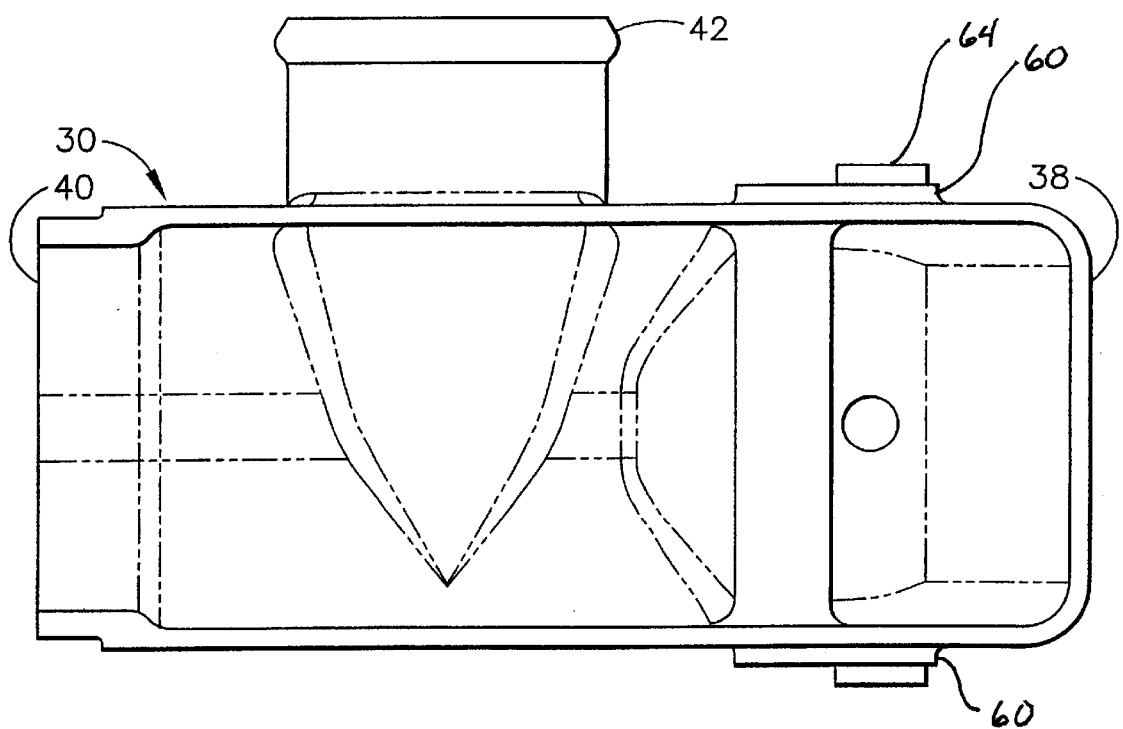
Figure 4C:
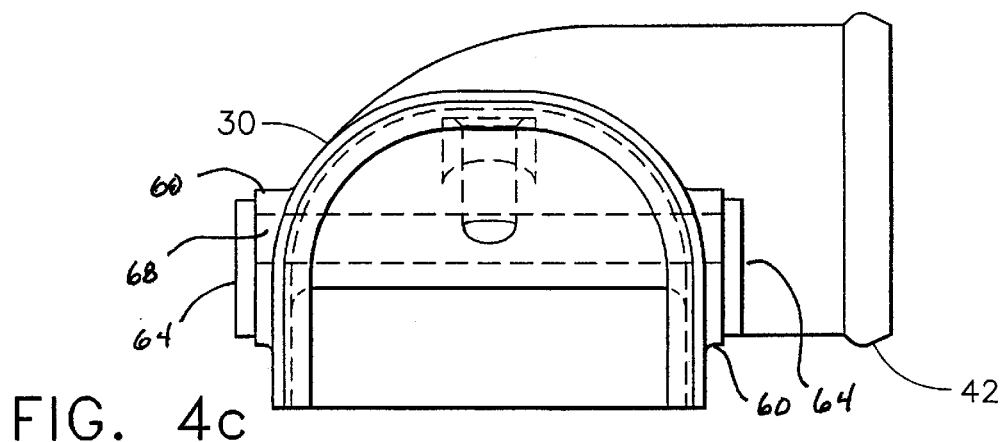
Figure 5A:
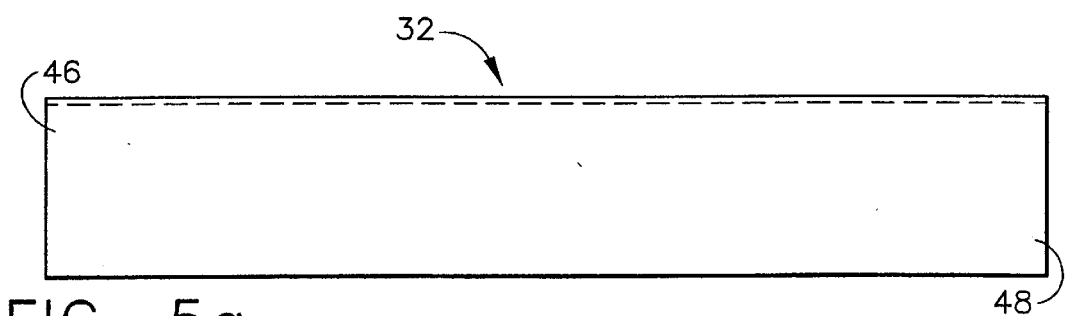
FIGS. 5a and 5b are multiple sectional views of a center section component.
Figure 5B:
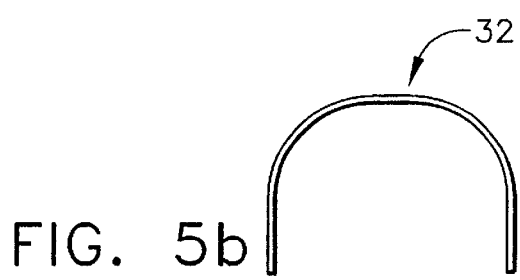

As can been seen in FIGS. 3a–3c, tank end 26 is a cast component having a generally U-shaped cross section, with a closed end 34, and an open end 36, opposite the closed end. Tank end with a fitting 30 as shown in FIGS. 4a–4c is a cast component of a similar construction having a generally U-shaped cross section, with a closed end 38 and an open end 40 opposite the closed end. However, as can best be seen in FIGS. 4a–4c, the tank end 30 also includes an inlet/outlet fitting 42 along and extending from a sidewall 44 thereof, in communication with the tank end 30. As described above, the fitting 42 permits fluid flow communication to and from the heat exchanger 10 through the header tanks. Referring now to FIGS. 5a and 5b, center section 32 is a formed sheet component having a generally U-shaped cross section, with open ends 46 and 48.

These basic components are assembled to provide the geometry of headers 14, 16. Open ends 36 and 40 of the tank ends are preferably welded or brazed to open ends 46 and 48, respectively, of the center section 32 to arrive at the heat exchanger tank design illustrated in FIGS. 2a–2d. The size of the tank depends on the size of the individual components. The size of the tank is adjusted as required by the application by adjusting the length of the center section 32.

Figure 6A:
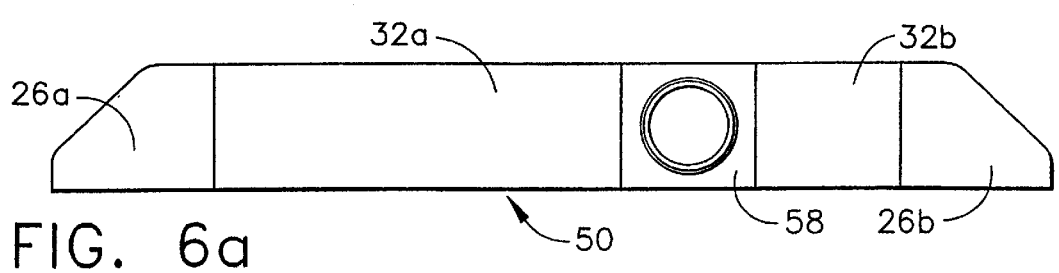
Figure 6B:
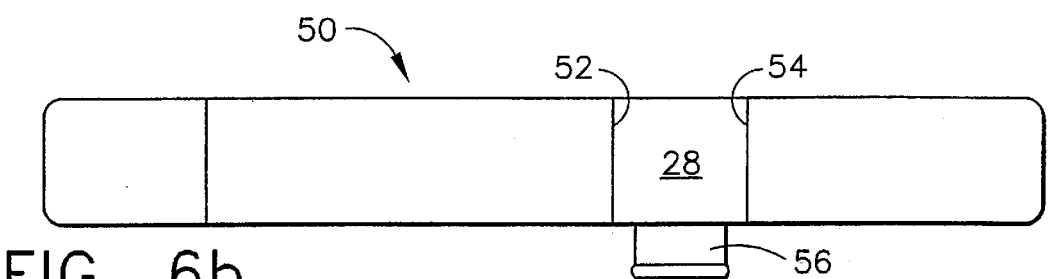

Referring now to FIGS. 6a and 6b, an alternate embodiment of a heat exchanger tank 50 according to the present invention is illustrated. The header tank 50 consists of a pair of tank ends 26a, 26b, an inlet/outlet fitting 28, and a pair of formed center sections 32a, 32b extending between the tank ends 26a, 26b and the fitting 28. Tank ends 26a, 26b and center sections 32a, 32b are identical in design to the corresponding components of the embodiment described above. Fitting 28 is a cast component having a generally U-shaped cross section with open ends 52 and 54. Additionally, fitting 50 includes an inlet/outlet tube 56 along, and extending from, a sidewall 58 thereof, to permit fluid flow communication to and from the heat exchanger through the header tanks.

As described above, these basic components are assembled to provide the geometry of header tank 50. Center section 32a is welded or brazed between tank end 26a and open end 52 of the fitting 50. Similarly, center section 32b is welded or brazed between tank end 26b and the other end 54 of the fitting 50, to arrive at the heat exchanger tank 50 design illustrated in FIGS. 6a and 6b. Again, the size of the tank is adjusted as required by the application by adjusting the length of the center sections 32a, 32b.

Figure 7:
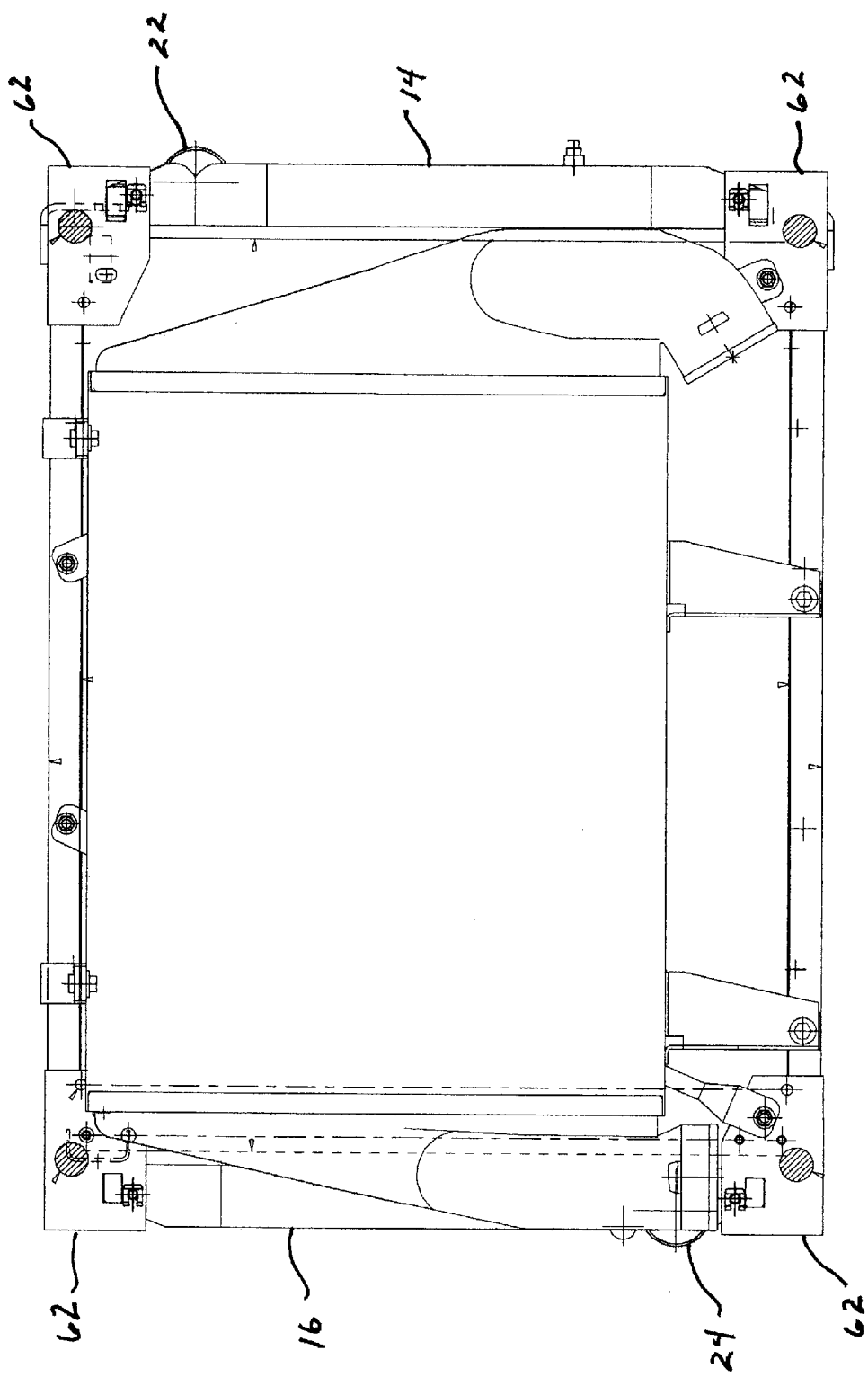
FIG. 7 is a front elevation view of an assembled radiator module demonstrating the attachment structure for the tank supports to the module frame.

As shown in FIG. 1a generally and in detail in FIGS. 3a, b, c, and 4a, b, c, the tank end components are formed with integral attachment fittings 60. The attachment fittings provide integral structural attachment points for bracketing and other support members to mount and secure a heat exchanger fabricated using the header tank components of the present invention. FIG. 7 shows a complete radiator module assembly incorporating a heat exchanger as disclosed in FIG. 1a. Corner brackets 62 are provided as structural attachments for the heat exchanger to the module. As best seen in FIG. 8, the corner brackets engage the attachment fittings on the tank end components, receiving flange 64 of the fitting in cutout 66 for placement and being secured with bolts 70 engaged in treaded bores 68 in the fitting. Incorporation of integral attachment fittings into the end tank end components allows simplicity in structural design of the support structure in addition to the fabrication simplicity of the heat exchanger tanks themselves.

While various embodiments of this invention have been shown and described, it would be apparent to those skilled in the art that many more modifications are possible without departing from the inventive concept herein. For example, the basic components described above may be used in other combinations to arrive at a desired heat exchanger tank geometry. Such modifications are within the scope and intent of the invention as defined in the following claims.

What is claimed is:

1. A method of constructing a heat exchanger header tank comprising the steps of:

casting a first common end component and a second common end component with integral attachment fittings;

selecting a length for at least one formed sheet component from a plurality of predetermined lengths;

cutting the at least one sheet component to the selected length; and connecting the at least one formed sheet component intermediate the first common end component and the second end component to form the header tank.

2. The method as defined in claim 1 wherein the step of casting includes forming an inlet/outlet fitting on the first common end component.

3. A method of constructing a heat exchanger comprising the steps of:

casting a first common end component and a second common end component having integral attachment fittings;

selecting a length for at least one formed sheet component from a plurality of predetermined lengths;

cutting the at least one sheet component to the selected length; and connecting the first and second common end components and the at least one formed sheet component together to form a first header tank;

repeating the previous steps to form a second header tank;

connecting the first and second header tanks to a heat exchanger core.

4. A method of constructing a heat exchanger header tank comprising the steps of:

casting a first common end component with a formed inlet/outlet fitting having integral attachment fittings and a second common end component having integral attachment fittings;

selecting a length for a formed sheet component from a plurality of predetermined lengths;

cutting the sheet component to the selected length; and welding the formed sheet component intermediate the first common end component and the second end component to form the header tank.

* * * * *